United States Patent [19]
Tzidon et al.

[11] Patent Number: 6,127,946
[45] Date of Patent: Oct. 3, 2000

[54] METHOD OF SELECTING AN OPTIMAL COMMUNICATION CHANNEL

[75] Inventors: Aviv Tzidon, Azur; Dekel Tzidon, Ramat Hagolan, both of Israel

[73] Assignee: B.V.R. Technologies Ltd., Giva Tayim, Israel

[21] Appl. No.: 09/041,755

[22] Filed: Mar. 13, 1998

[51] Int. Cl.[7] ................................................ G08G 1/123
[52] U.S. Cl. ................................. 340/988; 340/825.49
[58] Field of Search .......................... 340/988, 825.49, 340/573, 539, 693; 370/332, 337, 382; 455/33.1

[56] References Cited

U.S. PATENT DOCUMENTS

| | | | |
|---|---|---|---|
| 4,949,089 | 8/1990 | Ruszkowski, Jr. | 342/52 |
| 5,159,593 | 10/1992 | D'Amico et al. | 370/332 |
| 5,208,805 | 5/1993 | Ochiai | 370/382 |
| 5,396,644 | 3/1995 | Tzidon et al. | 455/33.1 |
| 5,493,309 | 2/1996 | Bjornholt | 342/455 |
| 5,537,467 | 7/1996 | Cheng et al. | 379/211 |
| 5,731,757 | 3/1998 | Layson, Jr. | 340/825.49 |

*Primary Examiner*—Michael Tokar
*Assistant Examiner*—Jean B. Jeanglaude
*Attorney, Agent, or Firm*—Mark M. Freidman

[57] ABSTRACT

A method of coordinating communications among several moving participants that have several communications channels available to them. Each participant is provided with a mechanism for continuously determining its own location and with a table of the locations of the other participants. Each participant selects the channel to use to communicate to each other participant, based on its own determined location and the tabulated locations of the other participants. Periodically, the participants broadcast their own locations to each other.

10 Claims, 1 Drawing Sheet

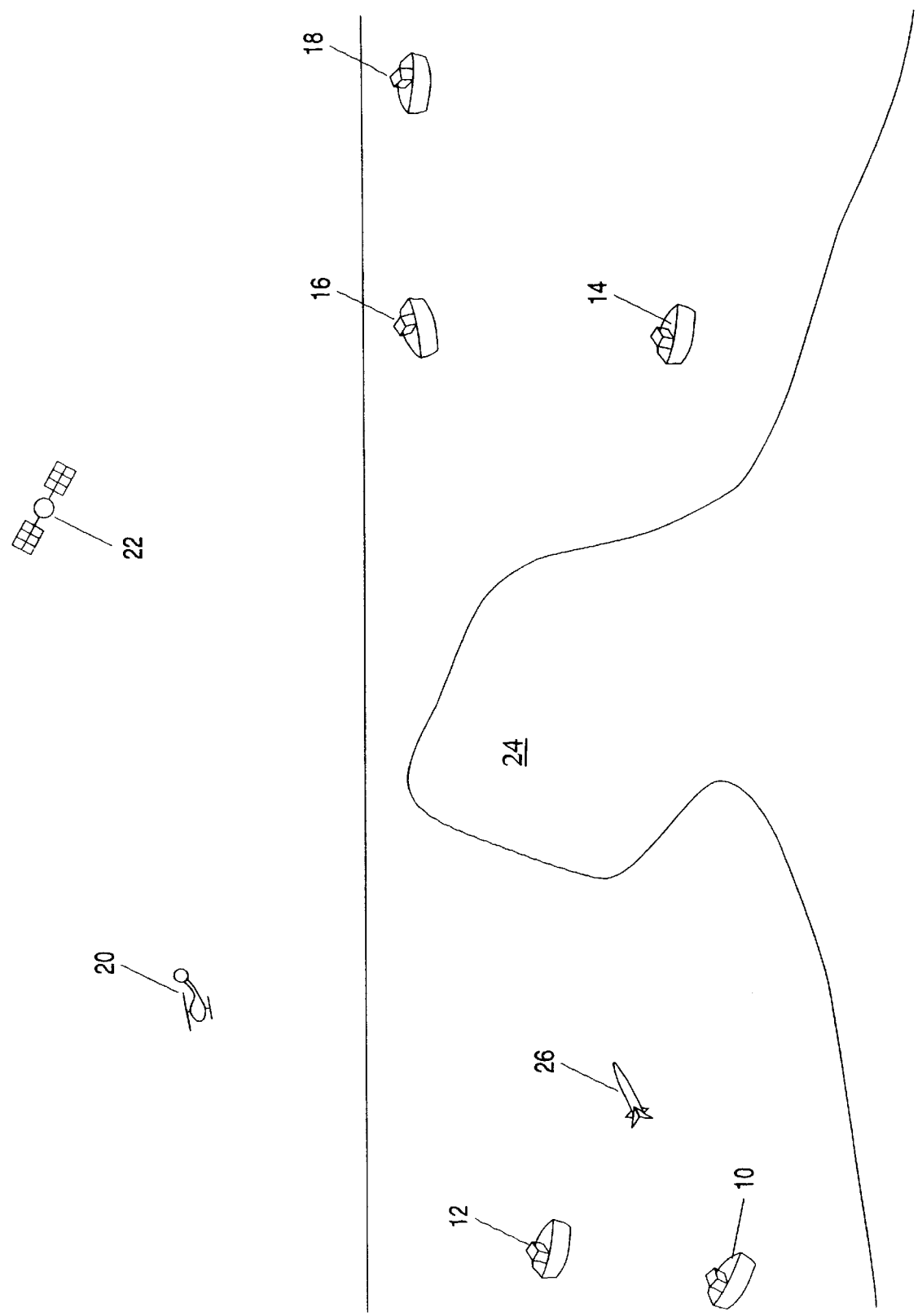

METHOD OF SELECTING AN OPTIMAL COMMUNICATION CHANNEL

FIELD AND BACKGROUND OF THE INVENTION

The present invention relates to communications among a group of moving participants and, more particularly, to a method for selecting, in real time, which of a number of communication channels is best for broadcast communications among the participants.

The Figure illustrates a scenario to which the present invention is applicable: naval maneuvers. A group of participants: ships 10, 12, 14, 16 and 18 and an aircraft 20, are engaged in war games. At various times during the war games, it is necessary for one of the participants to broadcast a message that will be received essentially simultaneously by all participants. For example, ship 10 may need to notify all the other participants that it has simulated the firing of a missile 26.

The participants in military maneuvers typically have several communication channels at their disposal, each channel having its own characteristics. As an illustrative example, the participants in the naval maneuvers of the Figure have at their disposal the following channels:

| channel | geometry | range | typical rate | latency |
|---|---|---|---|---|
| S-band | line-of-sight | 40 nautical miles | high | 200 µs |
| HF | indirect | 300 nautical miles | very low | 18 msec |
| satellite | indirect | global | very high | 0.2 sec |

The S-band channel is fast but is limited to line of sight communications. The "40 nautical miles" range is for communications between aircraft 20 and the other participants; the effective range between ships is limited to 15 nautical miles. At longer ranges, the much slower adaptive HF channel is used; and at still longer ranges, a satellite system, based on Earth satellites such as satellite 22, is used.

Because the three channels have different latencies, the signal from ship 10, that missile 26 has been launched, arrives at the other participants at different times. If all the participants had fixed locations, permanent broadcast communication channels could be selected according to the fixed distances between the participants, and the latencies of the channels could be built into the communications protocol. This cannot be done in this case because the participants are moving. For example, ship 18 is shown in the Figure out of S-band range of ship 12 but about to move within S-band range of ship 12. At the time of the Figure, ships 12 and 18 communicate using the adaptive HF channel, but they shortly will switch to the S-band channel.

There are two inferior solutions to this problem. One is for all participants to broadcast over all available channels, including in each signal an indication of the channel used, so that each recipient of a signal can compensate for the latency of whichever channel succeeds in relaying the signal to the recipient. This wastes bandwidth. The other solution is for all participants to use the channel with the longest range, which typically, as in this example, is also the channel with the longest latency, so that all signals have the same latency. The channel with the longest range typically, as in this example, also is the most expensive channel. Ships 10 and 12, which are in line-of-sight of each other, could communicate at less cost via the S-band channel than via satellite 22.

Tzidon et al., in U.S. Pat. No. 5,396,644, describe a communications method intended to make most efficient use of a short range communications system. According to this method, each participant keeps track of which other participants are within communication range, and available bandwidth is allocated so that no attempt is made by participants who are out of range of each other to communicate with each other. This method could be used, in the above example, to allocate S-band bandwidth most efficiently, but it is inherently limited to one communications channel, and cannot be used to allocate multiple communications channels among all participants.

There is thus a widely recognized need for, and it would be highly advantageous to have, a method by which moving participants could select among communications channels based on their instantaneous locations.

SUMMARY OF THE INVENTION

According to the present invention there is provided a method of coordinating communications among a plurality of participants using a plurality of channels, including the steps of: (a) providing each participant with: (i) a locator mechanism for determining a location of the participant, and (ii) a table of locations of the other participants; and (b) selecting, by at least one participant, one of the plurality of channels, for communicating with at least one other participant, based on the location of the at least one participant and the location of the at least one other participant as recorded in the table.

As defined herein, a "channel" is a shared communications medium or system. In the examples presented herein, the channels are distinct communications systems, but in other applications of the present invention, the domains could be different communications modes, such as different sets of time slots or different frequencies, within the same system.

BRIEF DESCRIPTION OF THE DRAWINGS

The invention is herein described, by way of example only, with reference to the accompanying drawings, wherein:

The sole FIGURE is a schematic depiction of naval maneuvers.

DESCRIPTION OF THE PREFERRED EMBODIMENTS

The present invention is of a method of coordinating communications among several moving participants. Specifically, the present invention can be used by each participant to select the optimal communications channel to use to communicate with any other participant.

The principles and operation of communications coordination according to the present invention may be better understood with reference to the drawing and the accompanying description.

According to the present invention, each participant is provided with a mechanism for continuously determining its location. This mechanism could be, for example, an inertial navigation device, or a global positioning system receiver. Each participant builds and maintains a dynamic table of the locations of all the other participants. These tables are initialized at some point in time, for example, by all participants broadcasting their locations on all available channels, and each participant recording, in its location table, the received location of every other participant.

Subsequently, each participant decides, on the basis of its own location and on the basis of the tabulated location of every other participant, which communications channel to use to communicate with each other participant. For example, in the scenario of the FIGURE, ship 12 computes its distance to ship 10, determines that that distance is less than maximum S-band range, and communicates with ship 10 using the S-band channel. Similarly, ship 12 computes its distance to ship 18, determines that ship 18 is outside of S-band range but within adaptive HF range, and communicates with ship 18 using the adaptive HF channel.

Periodically, the participants broadcast their own locations to each other. This broadcast of location is no different than any other broadcast by the participants (such as the broadcast by ship 10 that it has launched missile 26), and is done, by each participant to every other participant, using the appropriate channel as determined from each participant's instantaneous determined location and the tabulated locations of all the other participants. Having received the transmitted locations of all the other participants, each participant updates its location table accordingly. The frequency of location transmissions and updates depends on the speeds of the participants, in a way that will be obvious to those skilled in the art.

Most preferably, each participant is provided with a topographic map for use in determining which communications channel to use to communicate with any other participant. The topographic map may be used, for example, to determine whether two participants who are sufficiently close to use a line-of-sight communications channel actually are in line-of-sight of each other. For example, in the scenario of the FIGURE, ship 10 computes, based on its determined location and the tabulated location of ship 14, that ships 10 and 14 are within S-band range of each other. Ship 10 then determines, with reference to its topographic map, that promontory 24 blocks line-of-sight communications between ships 10 and 14. Ship 10 then communicates with ship 14 using the HF channel.

Alternatively, in this example, ship 10, upon determining that line of sight communication with ship 14 is blocked, can relay a message to ship 14 on S-band via aircraft 20.

While the invention has been described with respect to a limited number of embodiments, it will be appreciated that many variations, modifications and other applications of the invention may be made.

What is claimed is:

1. A method of coordinating communications among a plurality of participants using a plurality of channels, comprising the steps of:
   (a) providing each participant with:
      (i) a locator mechanism for determining an absolute location of said participant, and
      (ii) a table of absolute locations of the other participants; and
   (b) selecting, by at least one participant, one of the plurality of channels, for communication with at least one other participant, based on said absolute location of said at least one participant and said absolute location of said at least one other participant as recorded in said table.

2. The method of claim 1, further comprising the step of:
   (c) transmitting, by said at least one participant, said absolute location of said at least one participant, to said at least one other participant, via said selected channel.

3. The method of claim 2, further comprising the step of:
   (d) updating said table of said at least one other participant, based on said transmitted absolute location of said at least one participant.

4. The method of claim 1, wherein every participant effects said selecting with respect to every other participant.

5. The method of claim 4, further comprising the step of:
   (c) for each participant: transmitting said determined absolute location to each of the other participants, using said selected channel.

6. The method of claim 5, further comprising the step of:
   (d) updating said tables based on said transmitted absolute locations.

7. The method of claim 1, wherein said locator mechanism includes a global positioning system receiver.

8. The method of claim 1, wherein said locator mechanism includes an inertial navigation device.

9. A method of coordinating communications among a plurality of participants using a plurality of distinct communications systems, comprising the steps of:
   (a) providing each participant with:
      (i) a locator mechanism for determining an absolute location of said participant, and
      (ii) a table of absolute locations of the other participants; and
   (b) selecting, by at least one participant, one of the plurality of distinct communications systems, for communicating with at least one other participant, based on said absolute location of said at least one participant and said absolute location of said at least one other participant as recorded in said table.

10. A method of coordinating communications among a plurality of participants using a plurality of channels, comprising the steps of:
   (a) providing each participant with:
      (i) a locator mechanism for determining an absolute location of said participant, and
      (ii) a table of absolute locations of the other participants;
   (b) selecting, by each participant, for each other participant, one of the plurality of channels, for communicating with said each other participant, based on said absolute location of said each participant and said absolute location of said each other participant as recorded in said table;
   (c) for each participant: transmitting said determined location to every other participant using said selected channel; and
   (d) for each participant, receiving said transmitted location of every other participant.

* * * * *